(12) United States Patent
Stone

(10) Patent No.: US 6,635,861 B1
(45) Date of Patent: Oct. 21, 2003

(54) RELAXED TOLERANCE OPTICAL INTERCONNECT SYSTEM HAVING A GRIN ROD LENS

(75) Inventor: Thomas W. Stone, Hellertown, PA (US)

(73) Assignee: Wavefront Research, Inc., Bethlehem, PA (US)

(*) Notice: Subject to any disclaimer, the term of this patent is extended or adjusted under 35 U.S.C. 154(b) by 0 days.

(21) Appl. No.: 09/425,551

(22) Filed: Oct. 22, 1999

Related U.S. Application Data
(60) Provisional application No. 60/105,251, filed on Oct. 22, 1998.

(51) Int. Cl.[7] ............................................. H01J 3/14
(52) U.S. Cl. ...................... 250/216; 250/208.1; 359/652
(58) Field of Search ............................. 250/216, 208.1, 250/227.11, 201.1; 359/652, 654; 385/124

(56) References Cited

U.S. PATENT DOCUMENTS

| | | | |
|---|---|---|---|
| 4,148,550 A | 4/1979 | MacAnally | |
| 4,168,882 A | 9/1979 | Hopkins | |
| 4,612,670 A | 9/1986 | Henderson | 455/607 |
| 5,071,216 A | 12/1991 | Sullivan | 385/34 |
| 5,245,680 A | 9/1993 | Sauter | 385/24 |
| 5,266,794 A | 11/1993 | Olbright et al. | 250/214 LS |
| 5,291,324 A | 3/1994 | Hinterlong | 359/135 |
| 5,384,874 A | 1/1995 | Hirai et al. | 385/34 |
| 6,253,004 B1 | 6/2001 | Lee et al. | 385/31 |
| 6,297,894 B1 * | 10/2001 | Miller et al. | 359/35 |

OTHER PUBLICATIONS

Kenjiro Hamanaka "Optical Bus Interconnection System Using Selfoc Lenses", *Optics Letters vol. 16*, No. 16; 1222–1224, Aug. 15, 1991.

Hugo Thienpont, et al. "Free Space Optical Interconnect and Processing Demonstrators With Arrays of Light–Emitting Thyristors", *Proceedings of the SPIE, vol. 3002*, 156–167, Conference date 13–14 Feb., 1997 [probably published several months later].

Andrew Kirk, et al. "Compact Optical Imaging System for Arrays of Optical Thyristors", *Applied Optics 36, No. 14*, 3070–3078, May 10, 1997.

V. Baukens, et al. "An Optical Interconnection System for Arrays of MicroEmitters and Detectors: Combining Printed Microlenses and Large Diameter GRINs", *Proceedings of the SPIE*, vol. 3490, 155–158, Conference date (Belgium) 17–20 June, 1998 [probably published several months later]..

Tomasz Maj, et al. "Interconnection of a Two–Dimensional Array of Vertical–Cavity Surface–Emitting Lasers to a Receiver Array by Means of a Fiber Image Guide", *Applied Optics vol. 39, No. 5*, 683–689, Feb. 10, 2000.

(List continued on next page.)

*Primary Examiner*—Que T. Le
(74) *Attorney, Agent, or Firm*—Perkins, Smith & Cohen LLP; Jacob N. Erlich; Jerry Cohen

(57) ABSTRACT

An optical interconnect system having a GRIN rod lens, the GRIN rod lens having a first end and a second end, and further having a preselected length, a preselected width and a preselected index of refraction. Means are fixedly secured to the first end of the GRIN rod lens for emitting electromagnetic radiation and means are fixedly secured to said second end of said GRIN rod lens for receiving the emitted electromagnetic radiation. The GRIN rod lens forms an image of the emitting means onto the receiving means and overcomes problems associated with misalignment. Further embodiments of this optical interconnect system are capable of use in even further applications in an environment where alignment problems are at issue

62 Claims, 12 Drawing Sheets

OTHER PUBLICATIONS

Donald M. Chiarulli, et al. "Demonstration of a Multichannel Optical Interconnection by Use of Imaging Fiber Bundles Butt Coupled to Optoelectronic Circuits", *Applied Optics vol. 39, No. 5*, 698–703, Feb. 10, 2000.

Donald M. Chiarulli, et al. "Optoelectric Multi–Chip Modules Based on Imaging Fiber Bundle Structures", *Proceedings of the SPIE, vol. 4089*, 80–85, Conference date Jun. 18–23, 2000 [probably published several months later].

Valerie Baukens, et al., "Free Space Optical Interconnection Modules for 2–D Photonic VLSi Circuitry Based on Micro lenses and GRINs", *Proceedings of the SPIE, vol. 4114*, 169–181, Conference date Aug. 2–3, 2000 [probably published several months later].

Mohammad R. Taghizadeh, et al., "Microoptical Elements and Optoelectronic Devices for Optical Interconnect Applications", *Proceedings of the SPIE, vol. 4455*, 119–130, Conference date Jul. 29–31, 2001 [probably published several months later].

* cited by examiner

*Figure 3* (*PRIOR ART*)

Figure 8A — 0.1 mm DISPLACEMENT

Figure 8B — 0.4 mm DISPLACEMENT

Figure 8C — 0.7 mm DISPLACEMENT

Figure 8D — 1.0 mm DISPLACEMENT

RELAXED TOLERANCE OPTICAL INTERCONNECT SYSTEM HAVING A GRIN ROD LENS

CROSS REFERENCE TO RELATED APPLICATIONS

This application claims priority of U.S. provisional application Ser. No. 60/105,251 entitled OPTICAL DATA PIPE filed Oct. 22, 1998 by the present inventor.

STATEMENT OF GOVERNMENT INTEREST

This invention was made with U.S. Government support under Contract Nos. F08630-95-C-0095, F08630-97-C-0048, and F08630-98-C-0027 awarded by the U.S. Air Force. The Government has certain rights in the invention.

BACKGROUND OF THE INVENTION

The present invention relates generally to interconnection systems, and, more particularly, to alignment tolerant dense optical interconnect systems which incorporate the use of rod lenses. With the advent of substantial new performance levels in high bandwidth digital and analog electro-optic systems, there exists a greater need to provide dense, alignment tolerant interconnection capability. This is especially true in digital computing systems; in analog systems such as phased array radar; and in high bandwidth optical carriers in communication systems. However, it should be realized that these are just several of numerous systems which benefit from application of high-bandwidth electro-optic interconnection.

In many current and future systems light beams are modulated in a digital and/or analog fashion and used as "optical carriers" of information. There are many reasons why light beams or optical carriers are preferred in these applications. For example, as the data rate required of such channels increases, the high optical frequencies provide a tremendous improvement in available bandwidth over conventional electrical channels such as formed by wires and coaxial cables. In addition, the energy required to drive and carry high bandwidth signals can be reduced at optical frequencies. Further, optical channels, even those propagating in free space (without waveguides such as optical fibers) can be packed closely and even intersect in space with greatly reduced crosstalk between channels.

Conventional electrical interconnection over wires or traces is reaching severe performance limits due to density, power, crosstalk, time delay, and complexity. For example, chip scaling continues to provide for a doubling of transistors on a chip every 18 months. A 2 cm×2 cm chip currently requires 2 km of wires or traces for interconnection with 6 layers of metal and the complexity exponentiates with the number of metal layers. With designs using 0.18 micron wires, 60% of the delay is from the interconnects themselves. In shrinking from 0.5 micron wires to 0.18 micron wires on chip, the rc time constant increases by a factor of 10. Using optical interconnection, the power dissipation does not scale with the length of interconnection, and optical interconnects are superior for short signal rise times. Similar advantages of optical interconnection over electrical interconnection pertain to longer range interconnection, e.g., from chip-to-chip, intra-board, inter-board, and computer-to-peripheral.

Other optical interconnect approaches suffer from critical alignment tolerances; restrictive focusing, component separation and vibration tolerance requirements; insertion loss which limits speed and power efficiency; bulky and large-footprint optical systems; limited density and scalability; lack of physical flexibility and compliance of the interconnect, and the need to provide an excessively protective environment in order to maintain optical alignment over time.

It is therefore an object of this invention to provide a high density (many parallel interconnected channels in a small volume) optical interconnect system that can optically interconnect tens, hundreds, or thousands of high-bandwidth channels with a technology that is flexible and alignment tolerant.

It is another object of this invention to provide a high density optical interconnect system in which the component optical and electro-optical components are arranged in a single monolithic unit.

It is another object of this invention to provide a high density optical interconnect system that provides a nearly lossless one-to-one optical interconnection from a set of input channels to a set of output channels.

It is another object of this invention to provide a high density optical interconnect system that, by virtue of its low insertion loss, can provide very high-speed bidirectional interconnection among dense two-dimensionally packed interconnected channels.

It is another object of this invention to provide a high density optical interconnect system that can interconnect over distances spanning millimeters to tens of meters or longer.

It is further an object of this invention to provide a high density optical interconnect system that can be pre-aligned during manufacture and is thus readily fieldable by non-optically trained personnel.

It is further an object of this invention to provide a high density optical interconnect across single die or integrated circuit substrate, inside multi-chip modules, between die, between modules or components, between boards, between computers, between computers and peripherals, or between peripherals.

It is still further an object of this invention to provide a high density optical interconnect system that uses a small fraction of device area that would be required for arrays of traces, wires, or waveguides.

It is still further an object of this invention to provide a high density optical interconnect system that is capable of bending and flexing to accommodate components that shift relative to each other while maintaining interconnection of many parallel optical channels among the shifting components.

It is still further an object of this invention to provide a high density optical interconnect system that interconnects many parallel optical channels among components while maintaining relative insensitivity to longitudinal and lateral shifts between the interconnected components.

It is still further an object of this invention to provide a high density optical interconnect system that can be disconnected and reconnected simply while maintaining alignment among many parallel optical channels.

It is still further an object of this invention to provide a high density optical interconnect system that provides for a uniform delay for all channels, thus minimizing relative signal skews.

SUMMARY OF THE INVENTION

The objects set forth above as well as further and other objects and advantages of the present invention are achieved by the embodiments of the invention described hereinbelow.

The present invention overcomes problems associated with size, power, crosstalk, and speed associated with conventional electrical interconnects, and overcomes problems with alignment tolerance in conventional optical interconnection. In a preferred embodiment of The optical interconnect system or optical data pipe approach of the present invention, although not limited thereto, mating emitter and detector arrays are pre-aligned and fixed on or near the ends of a gradient index rod imager, and this flexible pre-aligned structure is then mounted to the host. Using this technology, which includes the various embodiments of this invention, hundreds or thousands of high bandwidth channels can be interconnected for short distances (intra-die, between neighboring chips or MCMs) or over relatively long distances (full board wrap-around, board-to-board, computer to peripheral, computer to computer, etc.). The optical interconnect system of this invention provides a nearly lossless one-to-one optical interconnection from a set of input channels to a set of output channels, and supports extreme density, low power, and low crosstalk for high bandwidth signals.

One of many advantages of the system of this invention is that it can be pre-aligned and fixed during manufacture (e.g., using automated alignment and cementing procedures) to produce optical interconnects that have greatly relaxed alignment tolerances and are thus readily), usable in the field by non-optical personnel. The interconnection systems of the present invention are thus tolerant of handling, bending and displacements among interconnected components without losing their function of interconnecting many closely packed (dense) optical channels. Other advantages of this invention late to the fact that it is tolerant of misalignments, vibrations, etc.

For a better understanding of the present invention, together with other and further objects, reference is made to the following description taken in conjunction with the accompanying drawings, and its scope will be pointed out in the appended claims.

DETAILED DESCRIPTION OF THE PREFERRED EMBODIMENTS

If an optical interconnect approach is to have a significant impact in practice, it must possess a variety of desirable characteristics including in particular a tolerance for misalignments and alignment variations among the interconnected components. These areas are highlighted and described briefly hereafter:

Alignment Tolerance, with the ability to function in a practical computer environment which is subject to vibrations, thermal variations, misalignments between interconnected components and devices, etc.

High channel density: allowing for hundreds of parallel channels to be interconnected with a small footprint.

High channel bandwidth: allowing for data rates in the megahertz an gigahertz regimes.

Low insertion loss: allowing for high speeds with low power consumption.

Uniform delay for all data channels, therefore introducing little or no relative skew in the switched signals.

Miniaturized opto-electronics interconnecting many parallel optical channels in a compact package. The ability to densely pack channels in volume (e.g., a slender flexible rod) rather than along planar substrate or circuit board surface will be a distinct advantage.

Low crosstalk between neighboring optical data channels.

Monolithic packaging for ruggedness and low insertion loss.

Scalability to large numbers of data channels.

Figure 1:
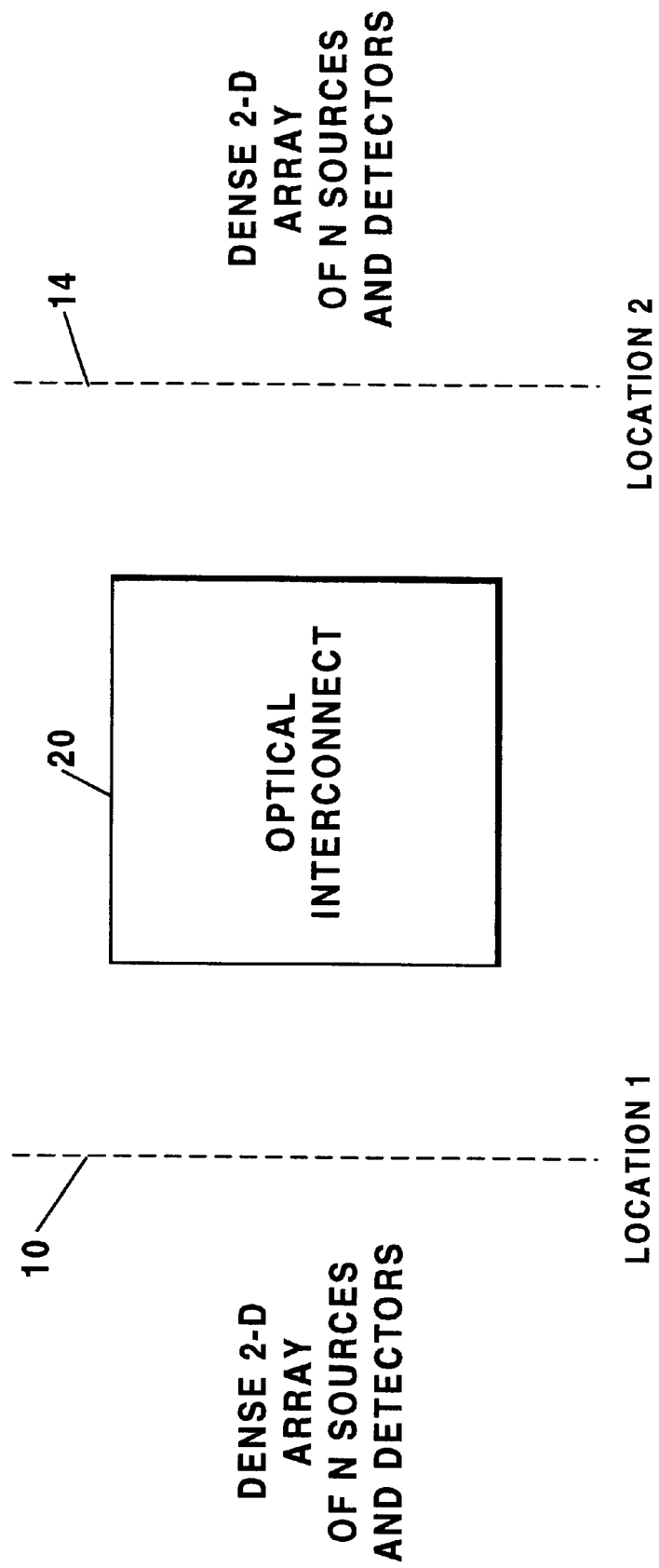
FIG. 1 is a schematic representation of the problem addressed by the optical interconnect systems of the present invention.

The general optical interconnection problem addressed by the present invention is shown in FIG. 1. Here there are two planes A1 and A2 of densely packed emitters and detectors that are interconnected by an optical interconnect 20. For clarity, not shown are the drivers for the emitters and amplifiers for the detectors. In general, each of the planes contain both emitters and detectors to enable bidirectional communication. The emitters are sources of electromagnetic radiation (in this application equivalently referred to as optical radiation, optical signals, or light). The electromagnetic radiation can be modulated to carry information that originated, for example, on electrical signals, and the electromagnetic radiation has a higher frequency than that of the information it carries. For example, the emitters can be sources of electromagnetic radiation in the infrared, visible, or ultraviolet spectral bands. This emitted electromagnetic radiation can then be modulated with information including frequencies and data rates ranging from DC to many gigahertz and higher. The detectors then receive the electromagnetic radiation and extract the information usually in the form of electrical signals. The terms electromagnetic radiation, optical signals, and light are used to refer to the high frequency electromagnetic radiation carrier described above and are distinguished from the information carried by the optical interconnect system and the input and output electrical signals, which can also be electromagnetic in nature. The optical interconnect systems described below of the present invention couple electromagnetic radiation from corresponding optical channels or among mating emitters and detectors with the features described above.

Figure 2:
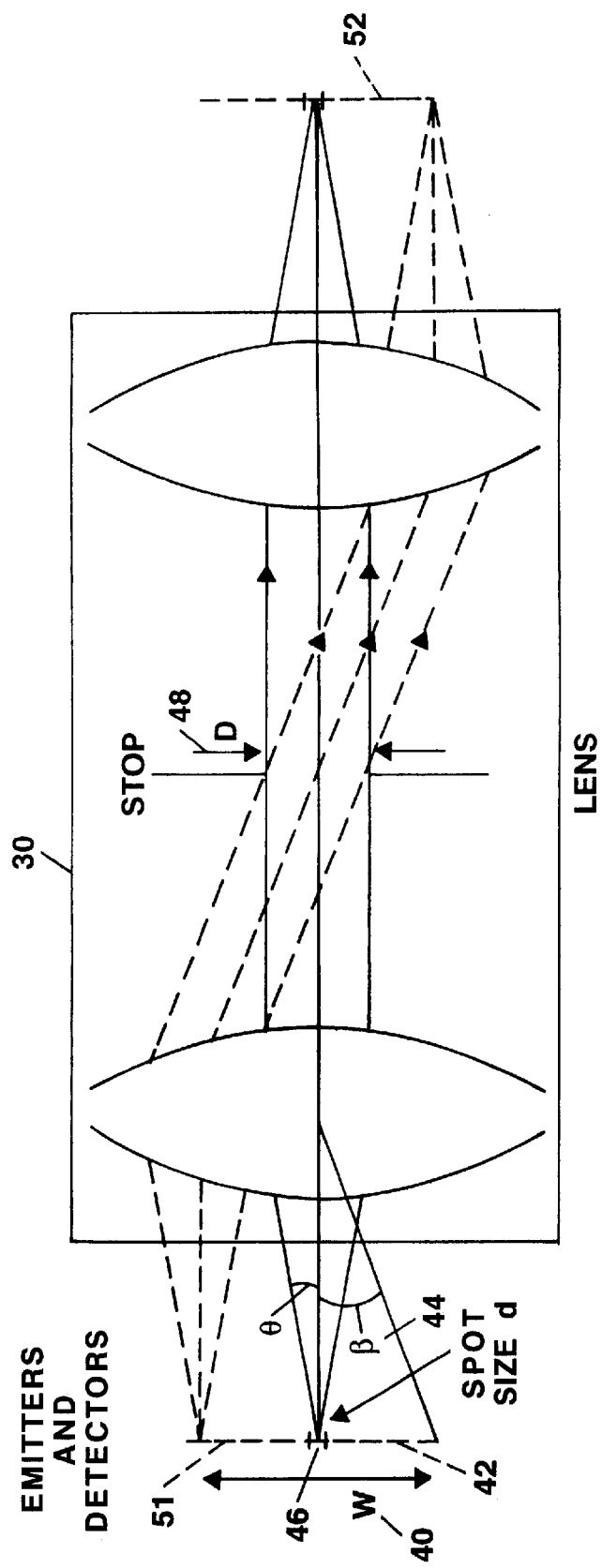
FIGS. 2 and 3 represent prior art approaches.

One of the two primary limiting approaches to this optical interconnect problem is the macro-optical approach. In macro-optics, a single optical system is used to simultaneously image the entire array of optical channels from emitter array to detector array. A typical prior art macro-optical imaging approach is illustrated in FIG. 2. Here a single lens system 30 is used to simultaneously image many optical channels 42 between planes 51 and 52. The optical channels are arrayed in the optical field extent 40 of width W. Key parameters for such a system are the field extent W, field angle 44 of width β, spot size or resolution 46 or d, and stop 48 of diameter D.

In the classic or prior art macro-optic approach, the tradeoffs are very well defined. The lens required to maintain small spot sizes d over a large device field W grows rapidly in complexity. For example, the spot size d of even a perfect lens is limited by diffractive spreading of the light through the finite aperture of the lens. If there were no aberrations in the lens, the spot size can be shrunk as far as to the order of a wavelength of the imaged light by increasing the stop diameter D, or equivalently by increasing the numerical aperture of the system (which is proportional to the sine of θ).

However, in practice there are always aberrations present. A major goal of the design of this prior art type of interconnect lens system is to reduce the magnitude of sum of the aberrations present to the order or magnitude of the desired spot size. Rather than attempting to eliminate each of the aberrations, they are balanced so that they form a net aberration magnitude that is acceptable. In order to accomplish this difficult task, many degrees of freedom are introduced including split and multiple elements, refractive surface curvatures, spacings, glass choice, apertures, etc.

Perhaps the largest limitation in the macro-optic approach is the lack of scalability of a given lens system. If there is a diffraction limited lens system that performs acceptably with spot size d over a field of extent W, a natural approach to increasing the covered field (and thus the number of optical channels that can be interconnected) is to scale up the size of the lens system by a factor s. In this process, linear dimensions are scaled and angles are preserved. Accordingly, the larger field with the same spot size should, in principle, provide for more independent optical channels. After scaling the lens, the diffraction limited spot size remains the same. However when scaling is performed, the forms of the aberrations remain the same but their magnitude is scaled by s. As a result, the balance of aberrations that was acceptable prior to scaling is no longer adequate. The net aberration magnitudes (which were in balance with the spot size prior to scaling) can scale larger than the desired spot size. As a result of the larger actual spot sizes, the scaled up field extent W can in practice eliminate any net increase of optical channels that are interconnected. The only alternative is to redesign the scaled lens in hope of reducing the magnitude of aberrations of the larger lens to the same magnitude which the lens had prior to scaling.

A further drawback for the macro-optic approach remains. If a single lens is used to image, using finite conjugates, arrays of emitters and detectors, there is still the unreasonable alignment sensitivity between the two planes. Relative motions between either of the planes, on the order of the detector sizes, will be catastrophic.

Figure 3:
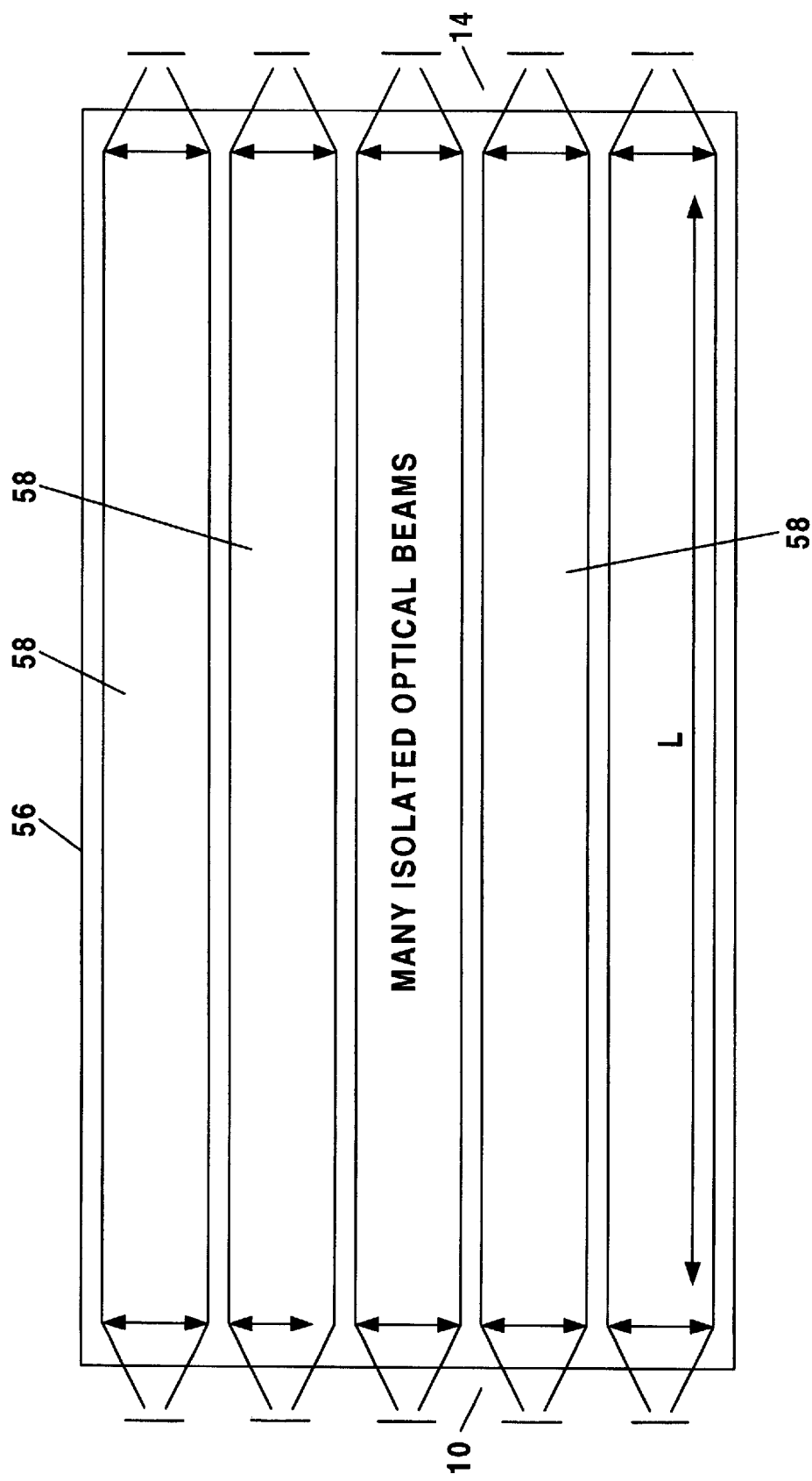

The other major limiting approach to the optical interconnect problem described above is the micro-optic approach. With micro-optics, many much-simpler parallel optical systems are used to image the many optical channels one at a time. These micro-optic elements are therefore arrayed in the parallel optical channels. This prior art approach is illustrated in FIG. 3, where two arrays of devices A1 and A2 are imaged with an array of simple refractive or diffractive micro lenses 56. The channels are interconnected by many isolated optical beams 58.

In this micro-optic limit, there is an imaging lens for each device. Since the device can be placed on the axis of symmetry of the simple lens elements, the performance of the lens does not need to be maintained over an extended field as was the case with the macro-optic limit. As a result, the complexity and size of the lens can be greatly scaled down. Further, another distinct advantage here is that there is a trivial scaling requirement, which now simply amounts to extending the size of the device array and corresponding size of the microlens array. This is in sharp contrast to the complex scaling problems in the macro-optic approach described previously.

There remains a significant problem, however, with the micro-optic approach to high density optical interconnection. This is due to the presence of diffractive crosstalk among neighboring optical channels. Diffractive spreading from the aperture of each of the microlenses causes light to couple into neighboring channels, resulting in crosstalk. The larger the aperture of the microlenses, the smaller is this diffraction spreading effect. However, since the neighboring lenses cannot overlap, reducing diffractive crosstalk forms a major performance tradeoff with density of the interconnection.

From a geometrical analysis augmented by results from diffraction theory, it can be shown that the optical signals in the parallel channels can propagate a critical distance $L_c$ before the beam, augmented by diffraction, will cross over into the neighboring channel—i.e., until the crosstalk becomes significant. This critical distance is given by:

$$L_c = D^2/2\lambda, \tag{1}$$

where D is the microlens aperture and λ is the communication wavelength.

Thus for a device spacing and microlens aperture of 100 microns, the beams can only propagate for a few millimeters before crosstalk is significant. Increasing the aperture of the microlenses results in a squared effect on the crosstalk free propagation distance, but if a large relay distance is required for the signals, the sought after high density of the optical channels must be sacrificed in order to prevent diffractive crosstalk.

Figure 4:
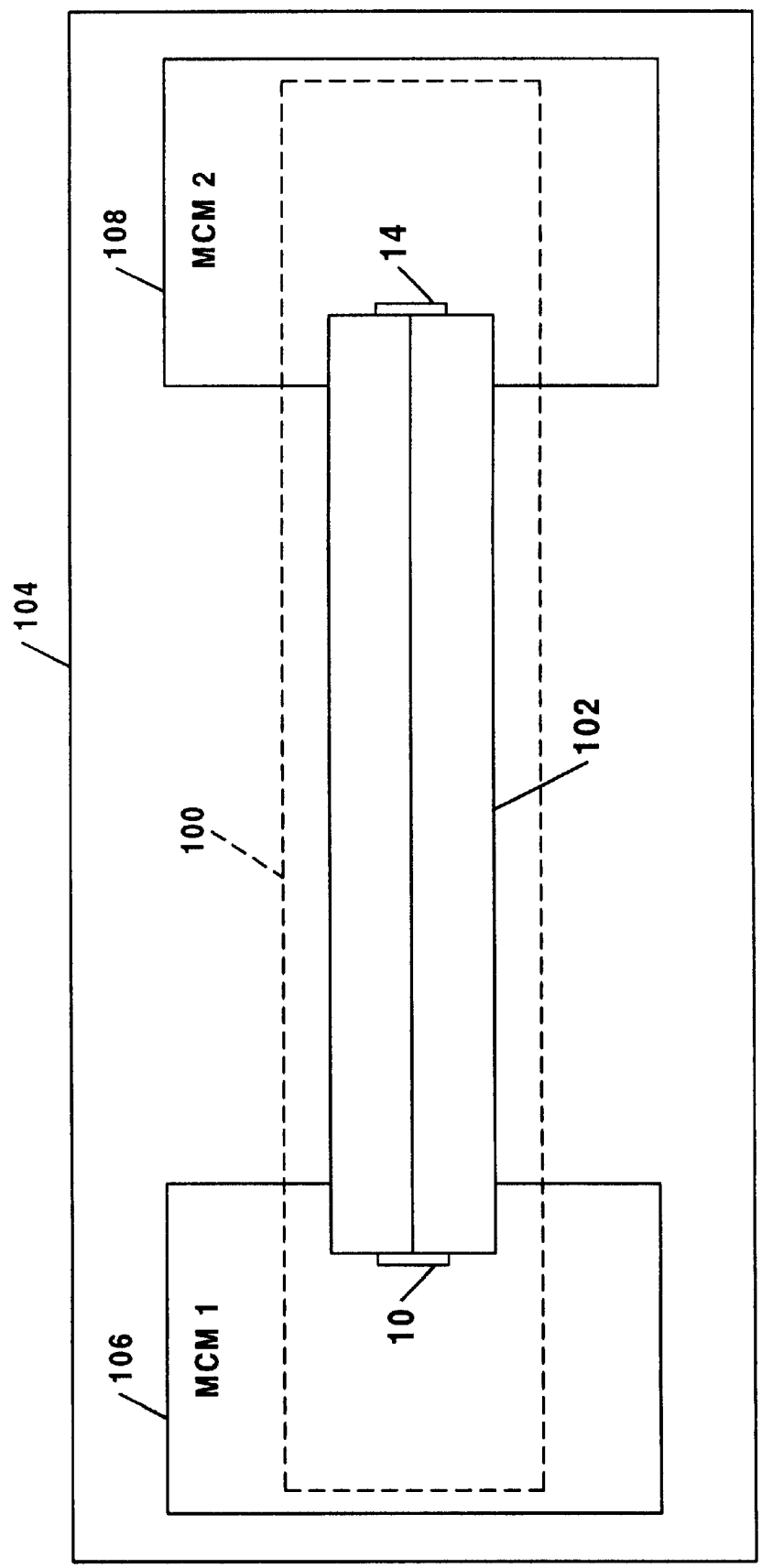
FIG. 4 is a schematic representation of a fixed point-to-point monolithic optical interconnect system of the present invention.

A first preferred embodiment of the relaxed tolerance optical interconnect system of the present invention is the fixed point-to-point monolithic optical data pipe 100 illustrated in FIG. 4, where the term optical data pipe may also be referred to herein on occasion as optical interconnect 100. Here mating interconnection planes 10 and 14 are affixed preferably by an adhesive "cement" on the ends of a gradient index (GRIN) rod imager 102, and this flexible pre-aligned structure is then mounted to the components 106 and 108 of host 104 which provides dense interconnection. The interconnection planes 10 and 14 can contain emitters, detectors, or general optical channel ports such as arrays of free-space channels or guided wave (fiber) channels, or the like. This device is capable of very high channel densities, on the order of hundreds along a cross section of only a few millimeters. Using demonstrated Vertical Cavity Surface Emitting Microlaser (VCSEL) technology, each of these channels is capable of multi-gigahertz data rates at these high spatial densities. The small insertion loss allows high data rates and low power consumption. Negligible temporal skews are generated once the optical signals are generated in the optical data pipe 100, independent of the length of the link (millimeters to feet). A distinct advantage of the monolithic construction of the optical data pipe 100 is that it is very tolerant of flexure and relative misalignments between the components being interconnected.

In the optical interconnect system of the present invention, also referred to as an optical data pipe 100, a gradient index (GRIN0 rod 102 is used as a data pipe for conducting hundreds of high bandwidth optical interconnections with little crosstalk. This high density, optical data pipe 100 is formed by pre-aligning and permanently affixing mated emitter and detector arrays to or near the ends of a gradient index (GRIN) rod lens imager. This rod lens images the optical channels, emitters, or detectors onto each other as conjugate image planes. The magnification can be unity or non-unity in this imaging operation. The monolithic end-to-end connection of device planes 10 and 14 and rod lens 102 forms a flexible pre-aligned structure capable of interconnecting hundreds of high bandwidth optical channels in a digital computer environment.

The gradient index rod lens 102 forms the backbone of the relaxed tolerance optical interconnect system 100 of the present invention. The rod lens 102 can be made with a broad range of diameters and lengths by controlling the gradient of the refractive index profile. The rod lens 102 is typically 0.2 mm–5.0 mm in diameter and can image with high resolution from rod face-to-rod face over distances from millimeters to many meters.

Figure 5:
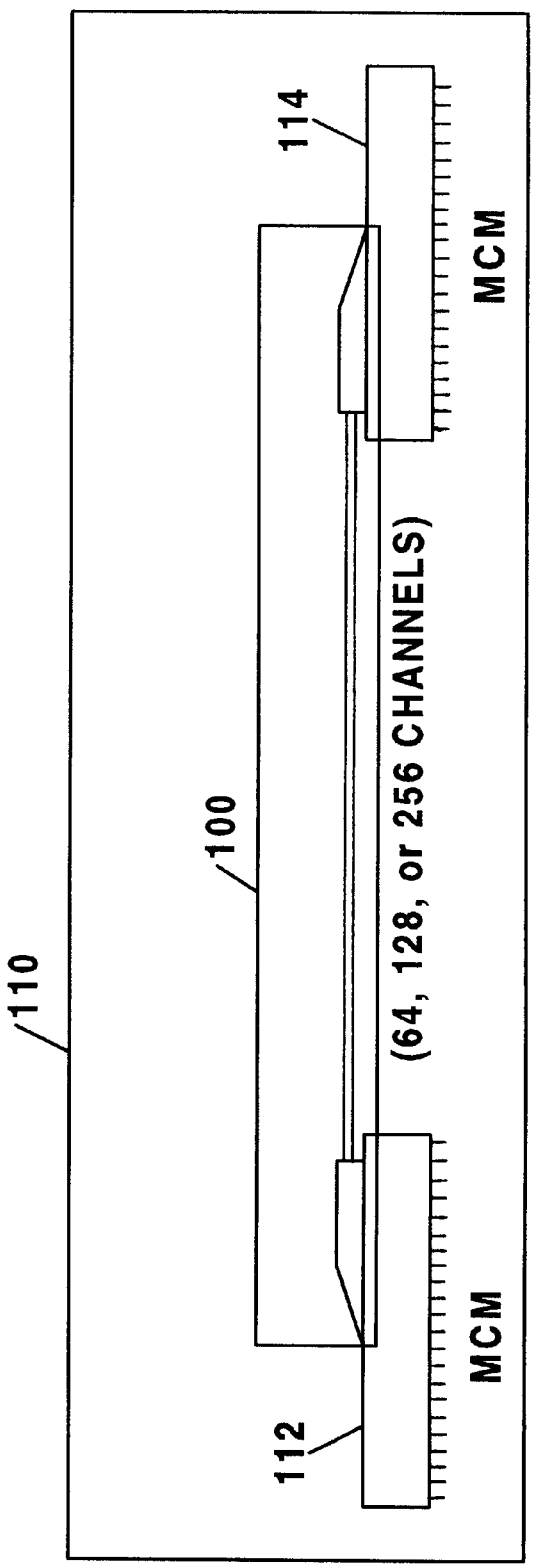
FIG. 5 is a schematic representation of an embodiment of an interconnection of the optical interconnect system of this invention.

In the optical data pipe 100, the interconnected planes 10 and 14 of optical channels are rigidly fixed as an integral part of the system. This link can then be mounted to interconnect multichip modules (MCMs), dies, or boards. This type of interconnection is illustrated in FIG. 5 where MCMs 112 and 114 are interconnected with optical data pipe 100. Similarly, drivers amplifiers, and supporting electronics can be grouped in place of MCMs 112 and 114 to form a plug-replaceable optical interconnect component 110 which is flexible and alignment tolerant. This flexible device offers relaxed alignment sensitivities with very high density of interconnected channels. For example, hundreds of multi-GHz channels can be interconnected through a cylinder that is ~2 mm in diameter and which can be several millimeters to meters long. The optical data pipe can be used for short-range or long-range (e.g., board wrap-around) high density communication that is established with transceiver modules 110 that include drivers, amplifiers, and other support for the pre-aligned emitter and detector arrays and rod lens.

The data pipe or optical interconnect system of the present invention has the benefit of relaxed alignment sensitivity since the critical elements are rigidly pre-aligned on the gradient index rod lens. Further, since the rod is flex-tolerant as shown below, misalignment and vibrations can be tolerated without interrupting the optical data communication. Additional benefits include a high channel density of high-bandwidth optical channels with negligible crosstalk or optically added signal skews, and sparse use of board real estate. This device can be used for dense short-range and long-range interconnection. An important part of the present invention is to pre-align and rigidly couple the emitters and detectors to ends only of the flexible gradient index (GRIN) rod lens thus forming a robust data pipe which is tolerant of stresses, vibrations, and misalignments typical in high performance computer and application environments.

The optical data pipe 100, while only typically on the order of several mm's in diameter, can relay hundreds of channels over distances spanning millimeters (for MCM-to-MCM communication); several tens of centimeters (for processor array wrap-around across a board, etc.); or even meters for applications such as linking supercomputers to external memory. This high density interconnection is accomplished with low loss, and clean imaging, and extreme densities.

The channels in the optical data pipe 100 can be packed with extreme density. For example, the optical channel pitch for emitters such as vertical cavity surface emitting microlasers (VCSELs) can be 125 microns or closer and still permit simultaneous operation due to recent VCSEL technology innovations. If a 32×32 VCSEL array has a 62.5 micron pitch, 1024 optical channels could fit in a 2 mm square. The key to these higher densities lies in reducing the heat and thermal crosstalk between neighboring channels. It is expected that simultaneous CW operation of arrays such as these with smaller pitches, e.g., 125 or 62.5 micron pitches are possible.

Higher densities may also be achieved through arranging the VCSEL devices on a hexagonally packed grid. The VCSEL array may be hexagonally packed in a circular array, and for bi-directional links, emitters and detectors may be tiled in some fashion on a single die.

Figure 6A:
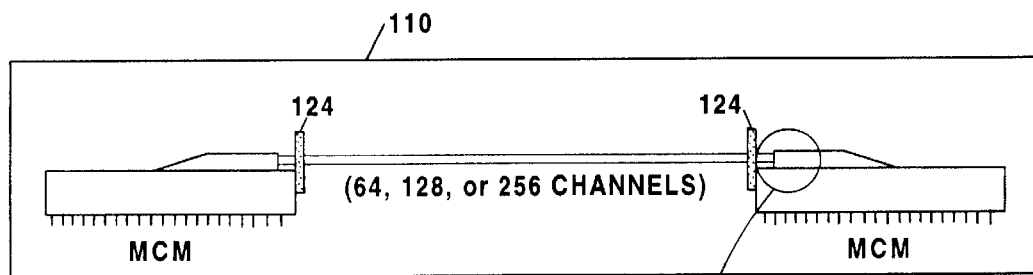
FIGS. 6A and 6B schematically and pictorially, respectively represent a dense hexagonally packed emitter array utilized with the present invention, with FIG. 6B being an exploded view thereof.
Figure 6B:
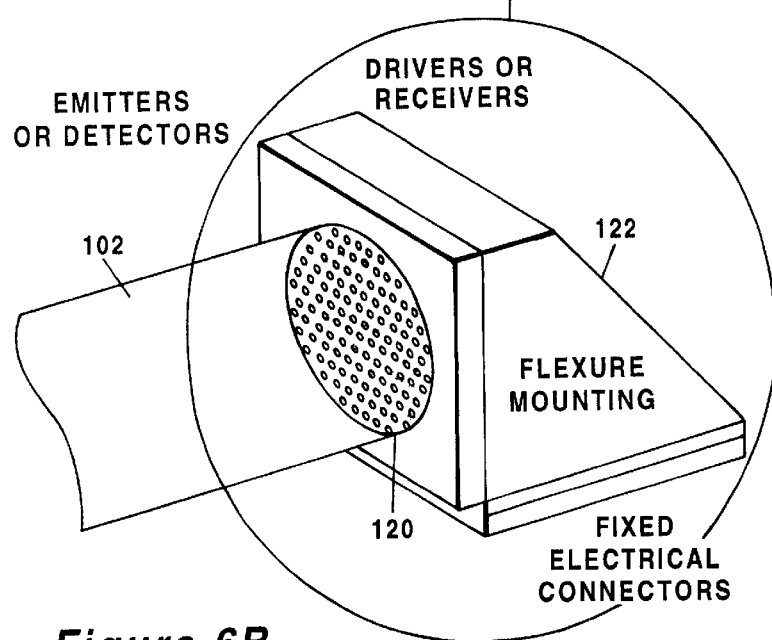

FIGS. 6A and 6B illustrate a dense circular hexagonally packed emitter array 120. Relaxed alignment tolerances are provided by either the natural flexibility of the slender GRIN rod lens, or flexure mountings 122 can be used to absorb misalignments between the MCMs and the pre-aligned optical components.

The fieldability and ruggedness of the optical data pipe or optical interconnect system of the present invention can be increased in several ways. For example, the ends of the GRIN rod lens may be rigidly affixed to the hosting MCMs. In this way, the natural flexibility of the data pipe can be used to absorb misalignments and vibrations among the circuit component ends. Accordingly the strain relief clamps 124 shown in FIG. 6A can be used to fix the GRIN rod lens rigidly to the transceiver modules, and since the GRIN rod lens is flexible, it can be used to absorb flexures and misalignments.

Figure 7:
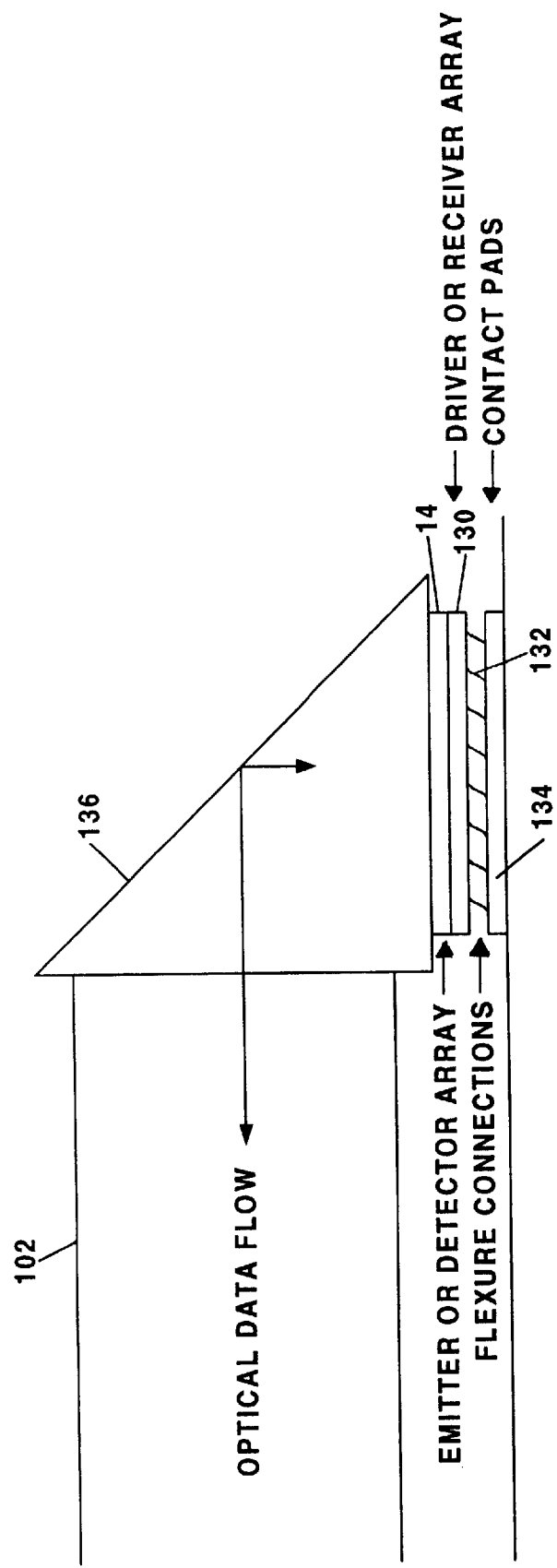
FIG. 7 is a schematic representation of a prism used with one embodiment o the optical interconnect system of this invention.

For many applications it is natural for the optical data pipe or optical interconnect system of this invention to lie parallel to a circuit board, and in those cases it may be more practical to have the emitter and detector arrays mounted parallel to the board rather than at an angle to it. This need can be accommodated by modifying the gradient profile of the rod lens so that conjugate planes are imaged off the end face of the rod. This permits the device arrays to be mounted on prisms or sub-assemblies as shown in FIG. 7. Here the end of the rod lens 102 is affixed to a prism/mirror 136 which directs the light toward the board. While the optical channel plane 14 is remote from the end of the rod 102 it is still fixed with respect to the rod end such as by cementing it to the prism/mirror 136. An array of drivers and receivers 130 can also be attached with interleaving flexible electrical connectors 132 optionally used to provide further alignment tolerance to component contact pads 134.

In FIG. 7, a prism 136 is used to fold the optical path at a right angle so the die can be more easily electrically connected to the host. Flexure connections 132 such as "s" springs can optionally be used to allow for small displacements as may be generated thermally.

Figure 8:
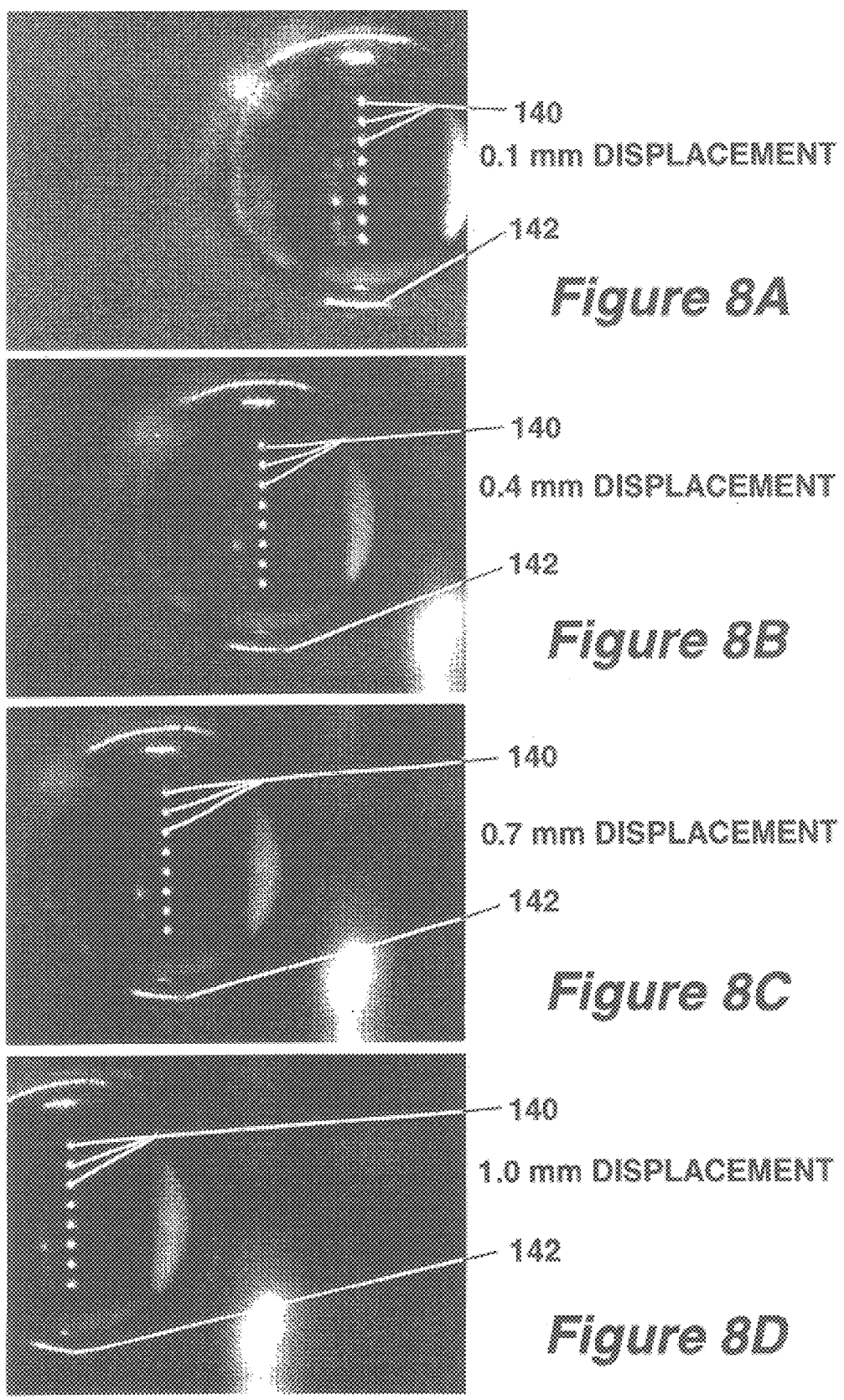
FIGS. 8A—8D are photographs of alignment of channels during bending of the optical interconnect system of the present invention.

Making use of the natural flexibility of the GRIN rod lens 102 is an important feature of this invention. The GRIN rod lens 102 of The optical interconnect system 100 of this invention can be bent and the aligument of the channels is maintained as illustrated in the photograph sequence of FIG. 8. Optical channels 140 remain fixed with respect to the rod lens end 142 as the long rod lens is bent with end-displacements of 0.1, 0.4, 0.7, and 1.0 mm in photographs 3A, 8B, 8C, and 8D, respectively. As the GRIN rod lens is deflected while carrying the image of an array of 8 VCSELs, the output face of the lens was photographed with a CCD camera and the output image remains essentially fixed in position on the output face. Thus when a detector array is pre-aligned and affixed on the face, deflections and mis-alignments of this order of magnitude can be tolerate without appreciable deleterious effects on the dense interconnection of the optical channels.

Quantitative data was also obtained where it was shown that for a deflection of 6 mm, the optical channels are deflected by less than 10 microns, if at all. Insensitivity of optical channel location with vibrations and misalignments are accommodated by the present optical interconnect system is a major feature of this invention.

Figure 9:
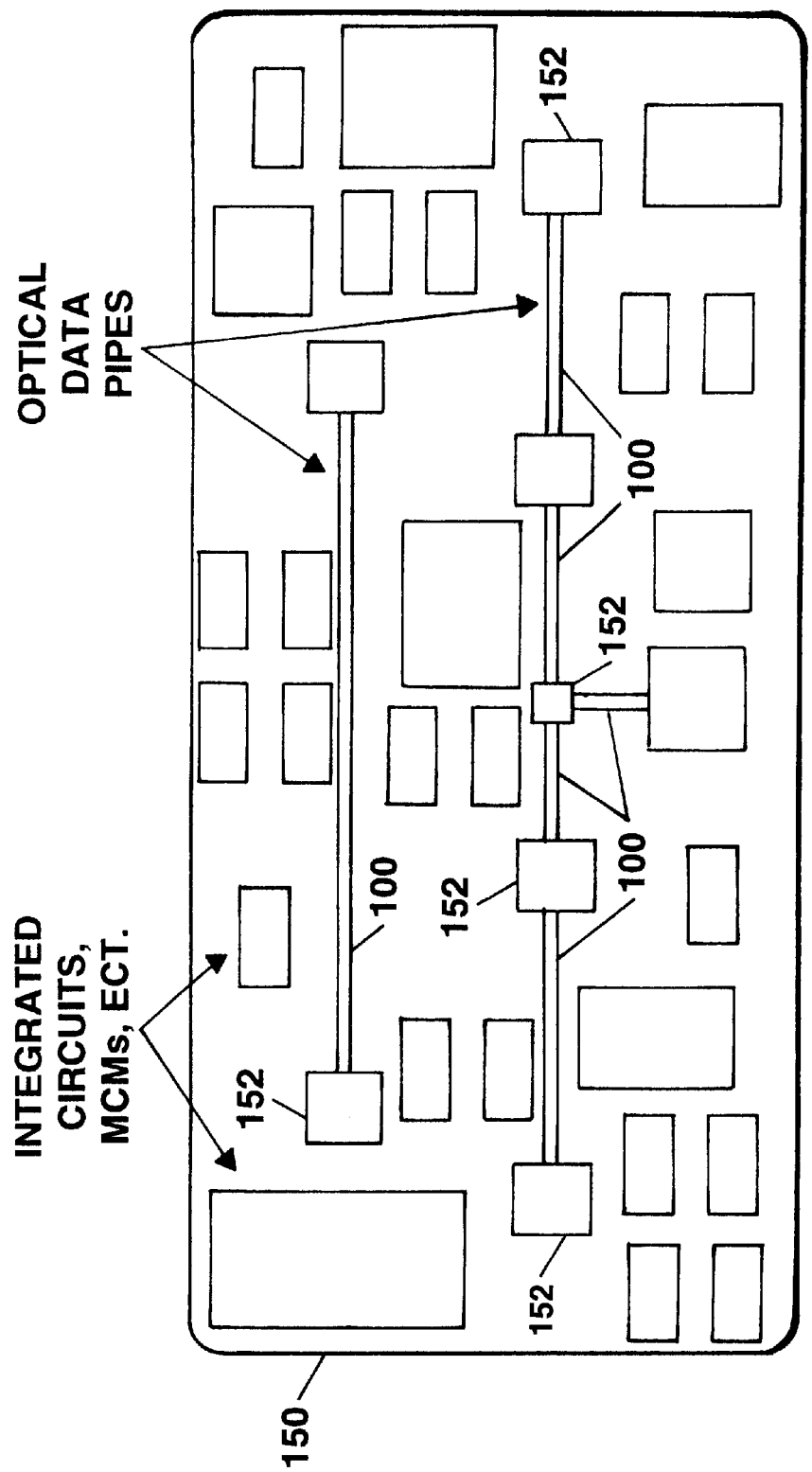
FIG. 9 is a schematic representation of a circuit board application of the optical interconnect system of this invention.

A typical circuit board application for The optical interconnect system of this invention is illustrated schematically in FIG. 9 Here remote MCMs or devices 152 are interconnected with hundreds of high bandwidth, low crosstalk, low skew channels using optical data pipes 100 on board 150, and with very efficient use of board real-estate. In each case, the optical data pipe 100 is flexible and connected rigidly at its ends only to the interconnected components. Other board placement variations which can be accomplished by the optical interconnect system of this invention similarly include, for example, board-to-board side connection, board-to-board edge connection, and system-to-system interconnection.

Figure 10:
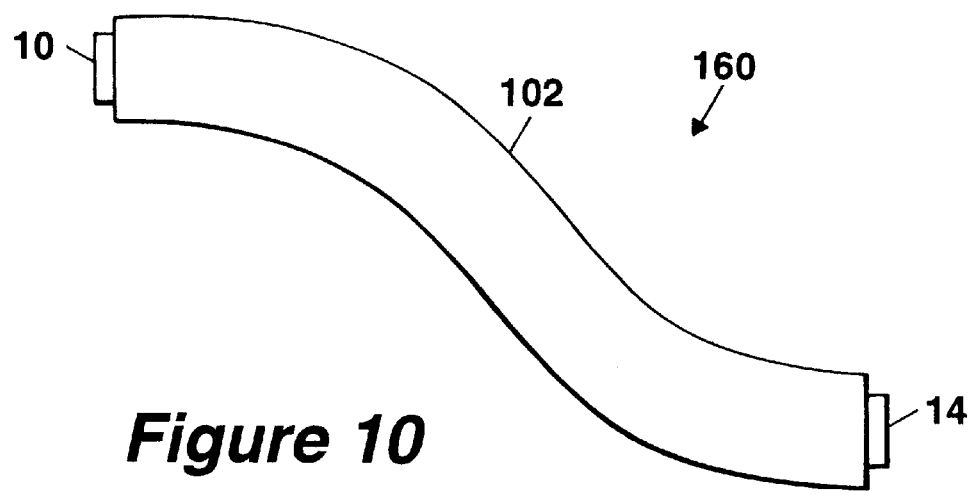
FIG. 10 is a schematic representation of an embodiment of this invention illustrating a curved optical interconnect (optical data pipe) used with this invention.

A further embodiment 160 of this invention involves the use of a GRIN rod lens 102 which is curved and still interconnect optical channel planes 10 and 14 as shown in FIG. 10. This curving rod may be obtained by heating a straight rod lens.

Figure 11:
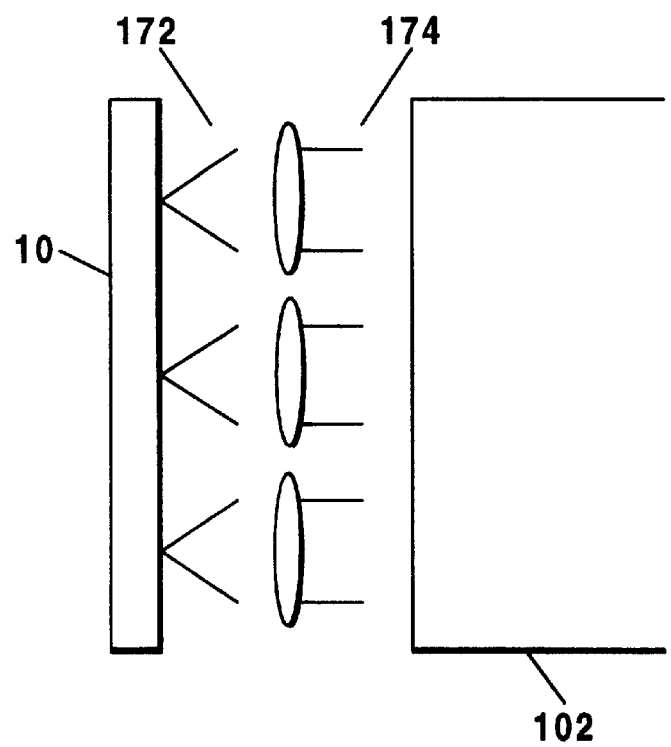
FIG. 11 is a schematic representation of micro-optic lens arrays used with the optical interconnect systems of this invention.

In FIG. 11 micro-optic lens arrays are shown to reduce the divergence angle (numerical aperture) of the light beams (channels) 172 emanating from optical channel plane 10. The smaller numerical apertures of the light beams 174 incident on the rod lens 102 can improve the transmission through the rod lens and lower the required numerical aperture of the rod lens used in the optical data pipe 100. This same technique is useful for an optical interconnect system of this invention where the planes 10 and 14 are spaced apart from the ends of the rod lens. In such as case, the light beams 172 can be nearly collimated and directed toward the rod lens 102 face thereby reducing or eliminating light loss.

Figure 12:
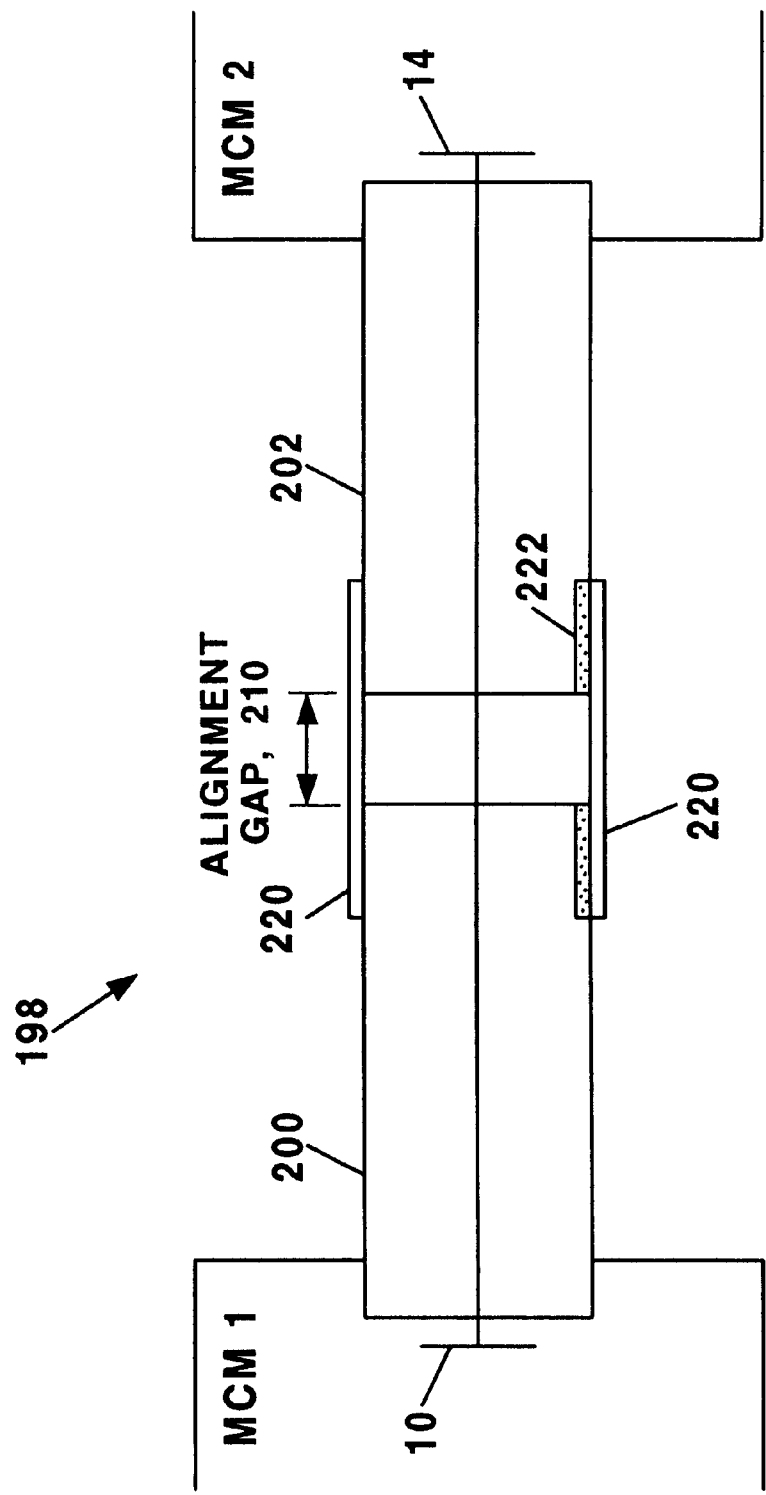
FIG. 12 is a schematic representation of another embodiment of The optical interconnect system of this invention.

Another embodiment of the relaxed tolerance interconnect system 198 of the present invention is shown in FIG. 12, which relaxes alignment tolerances by mounting symmetric infinite conjugate rod lens imagers 200 and 202 (which may be in the form of GRIN rod lenses) in pairs in front of mating optical channel planes 10 and 14. This inherently relaxes alignment sensitivities to gap width and lateral translation because beams from each channel are wide, collimated plane waves in the gap region 210. Lateral shifts of the order of channel spacing in plane 10 are usually devastating in micro-optic interconnection schemes, but result in very little loss with this embodiment of the present invention. Similarly, longitudinal motions that increase or decrease the gap region 210 produce only a slow walk-off of channel throughput and do not alter the tightly focused conjugate channel imaging in planes 10 and 14. An optional alignment sleeve or collar 220 can be used to make the interconnect easily disconnectable and reconnectable. A keyed groove 222 in collar 220 can be used to prevent rotational mis-alignment.

The relaxed tolerance approach of this invention as shown in FIG. 12 results in wide insensitivity to lateral and longitudinal misalignments (parallel and perpendicular to the direction of the alignment gap), which is critical for practical application. However there is still pronounced sensitivity to tilts between the two interconnection planes. Spacers may be used (see below) in some configurations to reduce the presence of tilts. Alternatively if the collar 20 is used but kept much shorter than the rod lens lengths, the same type of flexure benefit obtained in the optical data pipes described in earlier embodiments is retained since the rods can flex. Such flexure here too is with no ill effects since the collar maintains the alignment at the infinite conjugate interface region where gap width tolerances are also relaxed. This "cutting" of the optical data pipe or optical interconnect system 198 at infinite conjugate locations of the internal imaging adds an additional longitudinal alignment compliance to the system described earlier.

Figure 13:
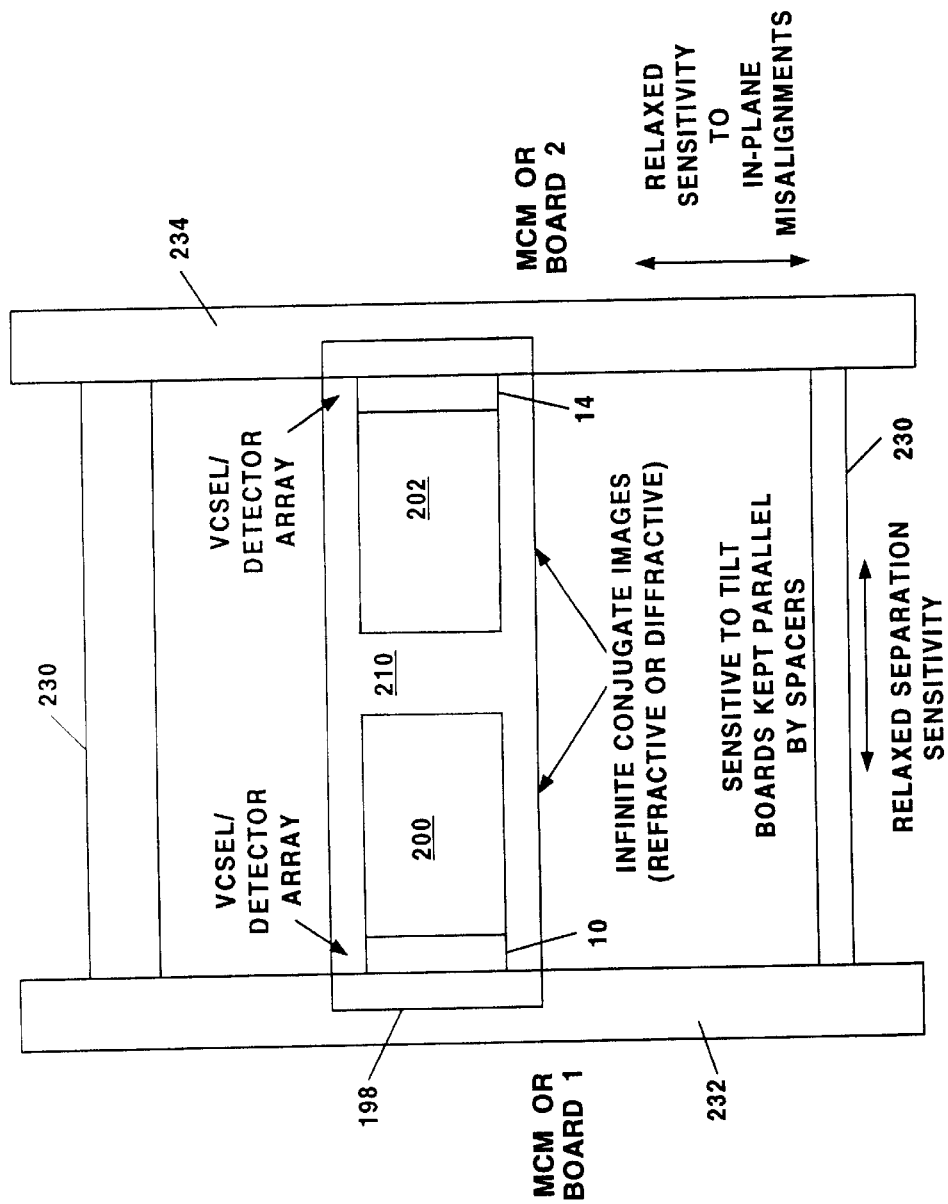
FIG. 13 is a schematic representation of a relaxed tolerance interconnect system of this invention linking channels between boards or MCM's.

The relaxed tolerance interconnect 198 of FIG. 12 can be used to provide parallel optical interconnection from board to board and similar scenarios. For example, FIG. 13 illustrates the relaxed tolerance interconnect system 198 linking channels between boards or MCMs 232 and 234. If no collar 220 is used, spacers 230 may be used to keep the boards parallel and thus angularly aligned.

Although the invention has been described with respect to various embodiments, it should be realized this invention is also capable of a wide variety of further and other embodiments within the spirit and scope of the appended claims.

What is claimed is:

1. An optical interconnect system, comprising:
    a GRIN rod lens, said GRIN rod lens having a first end and a second end, and further having a preselected length, a preselected width and a preselected index of refraction;
    means fixedly secured to said first end of said GRIN rod lens for emitting electromagnetic radiation;
    means fixedly secured to said second end of said GRIN rod lens for receiving said emitted electromagnetic radiation; and
    said GRIN rod lens forming an image of said emitting means onto said receiving means.

2. The optical interconnect system as defined in claim 1 further comprising connector attached at one end thereof to said receiving means.

3. The optical interconnect system as defined in claim 2 wherein said connector is flexible.

4. The optical interconnect system as defined in claim 2 further comprising, in combination therewith, a component for utilizing said electromagnetic radiation, said connector being attached at another end thereof to said component.

5. The optical interconnect system as defined in claim 4 wherein said electromagnetic radiation is in the form of optical signals and said component includes means for converting said optical signals into electrical signals.

6. The optical interconnect system as defined in claim 1 wherein
    said emitting means comprises an array of emitters and said receiving means comprises an array of detectors; and
    said image is an image of said array of emitters.

7. The optical interconnect system as defined in claim 1 further comprising:

means fixedly secured to said second end of said GRIN rod lens for emitting electromagnetic radiation; and means fixedly secured to said first end of said GRIN rod lens for receiving said emitted electromagnetic radiation from said emitting means secured to said second end.

8. The optical interconnect system as defined in claim 1 wherein said preselected length and said preselected width of said GRIN rod lens is defined to permit said GRIN rod lens to have some degree of flexibility.

9. The optical interconnect system as defined in claim 1 wherein said GRIN rod lens is of a curved configuration.

10. The optical interconnect system as defined in claim 4 further comprising, in combination therewith:

means for providing electrical signals and converting said electrical signals into optical signals;

said electrical signal providing and converting means being operably connected to said means for emitting said electromagnetic radiation, said electromagnetic radiation being in the form of optical signals.

11. An optical interconnect system, comprising:

a GRIN rod lens, said GRIN rod lens having a first end and a second end, and further having a preselected length, a preselected width and a preselected index of refraction;

means connected to said first end of said GRIN rod lens for emitting electromagnetic radiation;

means spaced apart from said second end of said GRIN rod lens for receiving said emitted electromagnetic radiation transmitted through said GRIN rod lens;

directing means interposed between said second end of said GRIN rod lens and said receiving means for directing said electromagnetic radiation to said receiving means;

said receiving means and said directing means are fixed with respect to another and fixedly secured in combination to said second end of said GRIN rod lens and said GRIN rod lens forming an image of said emitting means at said receiving means spaced apart from said second end of said GRIN rod lens.

12. The optical interconnect system as defined in claim 11 wherein said directing means comprises a reflecting component.

13. The optical interconnect system as defined in claim 11 wherein said directing means comprises a prism.

14. The optical interconnect system as defined in claim 11 further comprising a connector attached at one end thereof to said receiving means.

15. The optical interconnect system as defined in claim 14 wherein said connector is flexible.

16. The optical interconnect system as defined in claim 14 further comprising, in combination therewith, a component for utilizing said electromagnetic radiation, said connector being attached at another end thereof to said component.

17. The optical interconnect system as defined in claim 16 wherein said electromagnetic radiation is in the form of optical signals and said component includes means for converting said optical signals into electrical signals.

18. The optical interconnect system as defined in claim 11 wherein said emitting means comprises an array of emitters and said receiving means comprises an array of detectors; and said image is an image of said array of emitters.

19. The optical interconnect system as defined in claims 11 further comprising:

means connected to said second end of said GRIN rod lens for emitting electromagnetic radiation; and means connected to said first end of said GRIN rod lens for receiving said emitted electromagnetic radiation from said emitting means connected to said second end.

20. The optical interconnect system as defined in claim 11 wherein said preselected length and said preselected width of said GRIN rod lens is defined to permit said GRIN rod lens to have some degree of flexibility.

21. The optical interconnect system as defined in claim 11 wherein said GRIN rod lens is of a curved configuration.

22. The optical interconnect system as defined in claim 17 further comprising, in combination therewith:

means or providing electrical signals and converting said electrical signals into optical signals;

said electrical signal providing and converting means being operably connected to said means for emitting said electromagnetic radiation, said electromagnetic radiation being in the form of optical signals.

23. The optical interconnect system as defined in claim 11 wherein said emitting means is connected to said first end of said GRIN rod lens in a spaced apart relationship therewith and directing means interposed between said emitting means and said GRIN rod lens for directing substantially all said electromagnetic radiation from said emitting means into said GRIN rod lens and said emitting means and said directing means are fixed with respect to another and fixedly secured in combination to said first end of said GRIN rod lens.

24. The optical interconnect system as defined in claim 23 wherein said emitting means has a preselected numerical aperture and said GRIN rod lens has a preselected numerical aperture; and said directing means interposed between said emitting means and said GRIN rod lens also transforms said numerical aperture of said emitting means to be less than or equal to said preselected numerical aperture of said GRIN rod lens.

25. An optical interconnect system, comprising:

a GRIN rod lens, said GRIN rod lens having a first end and a second end, and further having a preselected length, a preselected width and a preselected index of refraction;

means fixedly secured to said first end of said GRIN rod lens for emitting electromagnetic radiation;

means fixedly secured to said second end of said GRIN rod lens for receiving said emitted electromagnetic radiation transmitted through said GRIN rod lens;

said emitting means having a preselected numerical aperture and said GRIN rod lens having a preselected numerical aperture;

said emitting means comprises at least one emitter and means interposed between said at least one emitter and said first end of said GRIN red lens for directing said electromagnetic radiation from said at least one emitter into said first end of said GRIN rod lens and for transforming said numerical aperture of said emitting means to be less than or equal to said preselected numerical aperture of said GRIN rod lens;

said at least one emitter and said directing means are fixed with respect to another and fixedly secured in combination to said first end of said GRIN rod lens; and said GRIN rod lens forming an image of said at least one emitter at said receiving means.

26. An optical interconnect system, comprising:
a GRIN rod lens, said GRIN rod lens having a first end and a second end, and further having a preselected length, a preselected width and a preselected index of refraction;
means fixedly secured to said first end of said GRIN rod lens for emitting electromagnetic radiation;
means fixedly secured to said second end of said GRIN rod lens for receiving said emitted electromagnetic radiation transmitted through said GRIN rod lens;
said emitting means comprising an array of emitters and said receiving means comprises an array of detectors;
said array of emitters having respective preselected numerical apertures and said GRIN rod lens having a plurality of preselected numerical apertures dependent upon their location along said first end of said GRIN rod lens; and
means interposed between said array of emitters and said first end of said GRIN rod lens for directing said electromagnetic radiation from said array of emitters into said first end of said GRIN rod lens and for transforming said numerical apertures of said array of emitters to be less than or equal to said preselected numerical apertures of said GRIN rod lens;
said array of emitters and said directing means are fixed with respect to another and fixedly secured in combination to said first end of said GRIN rod lens; and
said GRIN rod lens forming an image of said array of emitters at said array of detectors.

27. The optical interconnect system as defined in claim 6 wherein said preselected length and said preselected width of said GRIN rod lens is defined to permit said GRIN rod lens to have some degree of flexibility.

28. The optical interconnect system as defined in claim 7 wherein said preselected length and said preselected width of said GRIN rod lens is defined to permit said GRIN rod lens to have some degree of flexibility.

29. The optical interconnect system as defined in claim 18 wherein said preselected length and said preselected width of said GRIN rod lens is defined to permit said GRIN rod lens to have some degree of flexibility.

30. The optical interconnect system as defined in claim 19 wherein said preselected length and said preselected width of said GRIN rod lens is defined to permit said GRIN rod lens to have some degree of flexibility.

31. The optical interconnect system as defined in claim 25 wherein said preselected length and said preselected width of said GRIN rod lens is defined to permit said GRIN rod lens to have some degree of flexibility.

32. The optical interconnect system as defined in claim 26 wherein said preselected length and said preselected width of said GRIN rod lens is defined to permit said GRIN rod lens to have some degree of flexibility.

33. The optical interconnect system as defined in claim 25 wherein said GRIN rod lens is of a curved configuration.

34. The optical interconnect system as defined in claim 26 wherein said GRIN rod lens is of a curved configuration.

35. The optical interconnect system as defined in claim 25 further comprising:
means fixedly secured to said second end of said GRIN rod lens for emitting electromagnetic radiation; and
means fixedly secured to said first end of said GRIN rod lens for receiving said emitted electromagnetic radiation from said emitting means secured to said second end.

36. The optical interconnect system as defined in claim 26 further comprising:
means fixedly secured to said second end of said GRIN rod lens for emitting electromagnetic radiation; and
means fixedly secured to said first end of said GRIN rod lens for receiving said emitted electromagnetic radiation from said emitting means secured to said second end.

37. The optical interconnect system as defined in claim 4 wherein said component is a computer board.

38. The optical interconnect system as defined in claim 16 wherein said component is a computer board.

39. The optical interconnect system as defined in claim 4 wherein said component is a multi-chip module.

40. The optical interconnect system as defined in claim 16 wherein said component is a multi-chip module.

41. An optical interconnect system, comprising:
a first GRIN rod lens and a second GRIN rod lens;
said first GRIN rod lens having a first end and a second end, and further having a preselected length, a preselected width and a preselected index of refraction;
said second GRIN rod lens having a first end and a second end, and further having a preselected length, a preselected width and a preselected index of refraction;
means fixedly secured to said first end of said first GRIN rod lens for emitting electromagnetic radiation;
means fixedly secured to said second end of said second GRIN rod lens for receiving said emitted electromagnetic radiation;
said first GRIN rod lens forming an image of said emitting means substantially at infinity;
said second GRIN rod lens having its first end spaced apart and proximate said second end of said first GRIN rod lens;
said first end of said second GRIN rod lens and said second end of said first GRIN rod lens defining a space therebetween, wherein said space being substantially void of any optical component; and
said second GRIN rod lens forming an image of said emitting means onto said receiving means.

42. The optical interconnect system as defined in claim 41 further comprising a connector attached at one end thereof to said receiving means.

43. The optical interconnect system as defined in claim 41 wherein said connector is flexible.

44. The optical interconnect system as defined in claim 41 further comprising, in combination therewith, a component for utilizing said electromagnetic radiation, said connector being attached at another end thereof to said component.

45. The optical interconnect system as defined in claim 44 wherein said electromagnetic radiation is in the form of optical signals and said component includes means for converting said optical signals into electrical signals.

46. The optical interconnect system as defined in claim 41 wherein
said emitting means comprises an array of emitters and said receiving means comprises an array of detectors; and
said image is an image of said array of emitters.

47. The optical interconnect system as defined in claim 41 further comprising:
means fixedly secured to said second end of said second GRIN rod lens for emitting electromagnetic radiation; and
means fixedly secured to said first end of said first GRIN rod lens for receiving said emitted electromagnetic radiation from said emitting means secured to said second end of said second GRIN rod lens.

48. The optical interconnect system as defined in claim 41 wherein said preselected length and said preselected width of said first and said second GRIN rod lens, respectively, is defined to permit each of said first GRIN rod lens and said second GRIN rod lens to have some degree of flexibility.

49. The optical interconnect system as defined in claim 41 wherein at least one of said GRIN rod lenses is of a curved configuration.

50. The optical interconnect system as defined in claim 45 further comprising, in combination therewith:

means for providing electrical signals and converting said electrical signals into optical signals;

said electrical signal providing and converting means being operably connected to said means for emitting said electromagnetic radiation, said electromagnetic radiation being in the form of optical signals.

51. The optical interconnect system as defined in claim 41, wherein said means for emitting electromagnetic radiation is a component on a circuit board.

52. The optical interconnect system as defined in claim 41, wherein said means for receiving electromagnetic radiation is a component on a circuit board.

53. The optical interconnect system as defined in claim 41, wherein said means for emitting electromagnetic radiation is a component on a multichip module.

54. The optical interconnect system as defined in claim 41, wherein said means for receiving electromagnetic radiation is a component on a multichip module.

55. An optical interconnect system, comprising:

a first GRIN rod lens, said first GRIN rod lens having a first end and a second end, and further having a preselected length, a preselected width and a preselected index of refraction;

a second GRIN rod lens, said second GRIN rod lens having a first end and a second end, and further having a preselected length, a preselected width and a preselected index of refraction;

means fixedly secured to said first end of said first GRIN rod lens for emitting electromagnetic radiation;

means fixedly secured to said second end of said second GRIN rod lens for receiving said emitted electromagnetic radiation;

said first GRIN rod lens and said emitting means being attached to a first circuit board;

said second GRIN lens and said receiving means being attached to a second circuit board;

said first GRIN rod lens forming an image of said emitted radiation substantially at infinity; and said second GRIN rod lens forming an image of said emitted electromagnetic radiation from said first GRIN rod lens onto said receiving means.

56. The optical interconnect system as defined in claim 55 wherein said preselected length and said preselected width of said first and said second GRIN rod lens, respectively, is defined to permit each of said first GRIN rod lens and said second GRIN rod lens to have some degree of flexibility.

57. The optical interconnect system as defined in claim 55 wherein said emitting means comprises an array of emitters and said receiving means comprises an array of detectors; and said image is an image of said array of emitters.

58. The optical interconnect system as defined in claim 55 further comprising:

means fixedly secured to said second end of said second GRIN rod lens for emitting electromagnetic radiation; and means fixedly secured to said first end of said first GRIN rod lens for receiving said emitted electromagnetic radiation from said emitting means secured to said second end of said second GRIN rod lens.

59. An optical interconnect system, comprising:

a first GRIN rod lens, said first GRIN rod lens having a first end and a second end, and further having a preselected length, a preselected width and a preselected index of refraction;

a second GRIN rod lens, said second GRIN rod lens having a first end and a second end, and further having a preselected length, a preselected width and a preselected index of refraction;

means fixedly secured to said first end of said first GRIN rod lens for emitting electromagnetic radiation;

means fixedly secured to said second end of said second GRIN rod lens for receiving said emitted electromagnetic radiation;

said first GRIN rod lens and said emitting means being attached to a first multichip module;

said second GRIN lens and said receiving means being attached to a second multichip module;

said first GRIN rod lens forming an image of said emitted radiation substantially at infinity; and said second GRIN rod lens forming an image of said emitted electromagnetic radiation from said first GRIN rod lens onto said receiving means.

60. The optical interconnect system as defined in claim 59 wherein said preselected length and said preselected width of said first and said second GRIN rod lens, respectively, is defined to permit each of said first GRIN rod lens and said second GRIN rod lens to have some degree of flexibility.

61. The optical interconnect system as defined in claim 59 wherein said emitting means comprises an array of emitters and said receiving means comprises an array of detectors; and said image is an image of said array of emitters.

62. The optical interconnect system as defined in claim 59 further comprising:

means fixedly secured to said second end of said second GRIN rod lens for emitting electromagnetic radiation; and means fixedly secured to said first end of said first GRIN rod lens for receiving said emitted electromagnetic radiation from said emitting means secured to said second end of said second GRIN rod lens.

* * * * *